(12) United States Patent
Safoutin

(10) Patent No.: US 8,630,993 B2
(45) Date of Patent: *Jan. 14, 2014

(54) TIME-CONDITIONED SEARCH ENGINE INTERFACE WITH VISUAL FEEDBACK

(76) Inventor: Michael John Safoutin, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/417,348

(22) Filed: Mar. 12, 2012

(65) Prior Publication Data

US 2012/0174024 A1 Jul. 5, 2012

Related U.S. Application Data

(63) Continuation of application No. 12/074,364, filed on Mar. 3, 2008, now Pat. No. 8,135,696.

(60) Provisional application No. 60/904,521, filed on Mar. 3, 2007.

(51) Int. Cl.
*G06F 17/30* (2006.01)

(52) U.S. Cl.
USPC .......................................... 707/706; 715/781

(58) Field of Classification Search
USPC .......................................... 707/706; 715/781
See application file for complete search history.

(56) References Cited

U.S. PATENT DOCUMENTS

2006/0101005 A1* 5/2006 Yang et al. ...................... 707/3

\* cited by examiner

*Primary Examiner* — Joshua Bullock

(57) ABSTRACT

A human-computer interface for a search engine or similar application includes specification means for a time condition applicable to a search query, and visual feedback means expressive of relative availability of sought or potentially sought database items at one or more specific times within a time period under consideration. The invention provides a new and unique way to support interactive searching of a database that includes information relating to time availability of represented items, in order to identify items that match one or more search term(s) and are available at a specific time or during a specific time period.

18 Claims, 6 Drawing Sheets

TIME-CONDITIONED SEARCH ENGINE INTERFACE WITH VISUAL FEEDBACK

CROSS-REFERENCE TO RELATED APPLICATIONS

This application is a continuation of application Ser. No. 12/074,364, filed Mar. 3, 2008, now issued as U.S. Pat. No. 8,135,696, which claims the benefit of U.S. Provisional Application No. 60/904,521, filed Mar. 3, 2007. Both Applications are incorporated herein by reference in their entirety.

STATEMENT REGARDING FEDERALLY SPONSORED RESEARCH OR DEVELOPMENT

Not Applicable

TECHNICAL FIELD

The present invention relates to human-computer interfaces for information retrieval and representation, particularly with respect to internet-based or desktop-computer-based search engine applications.

BACKGROUND OF THE INVENTION

A popular application for desktop- and server-based computing is the searchable database. In such an application, typically a large number of database records consisting of various fields of information that describe various attributes of entities of any sort are stored by means of disk storage or in computer memory, and may be queried for specific information by means of a human-computer interface adapted for the purpose. For example, an internet search engine might, through a web browser on a desktop computer, provide an interface for searching a database of records that is stored either on the desktop computer or remotely on a server computer. The database records might represent attributes of documents found on the internet, and the provided interface might include means for a user to specify a search query representing the type of information that is desired to be retrieved. The search engine utilizes the search query to identify matching items in the database, retrieves information about the matching items, and communicates a representation of the matching items to the user.

This type of application presents many opportunities for an interface designer to provide means for user specification of the search query, and to provide means by which results may be communicated back to the user. For example, a search engine interface might provide an editable field in which to type a textual phrase or set of keywords as the search query. It is also known in the art to provide for multiple possibly non-textual search terms as components of the search query, for example, to specify that only records of a certain class or a certain age be searched. Once matches are identified and retrieved, the search engine might then represent the retrieved information, for example, by displaying a list of titles of database records that match the search query. Such a list might also be optionally sortable by derived criteria such as relevance scores or the age of each corresponding database record. Prior art search engines predominantly follow the abovedescribed general design or variations thereof. This family of designs can be characterized as responding to primarily textual search queries with a primarily textual expression of results, whose relevance are determined by means of various often proprietary measures of textual or semantic similarity.

However, it is possible to imagine legitimate types of queries that would be difficult to specify in terms of a primarily textual query, and would be difficult to effectively utilize if so provided. For example, it has long been recognized in the search engine art that it is not straightforward to employ a textual query toward the goal of matching graphical images in a database. Because graphical images are inherently nontextual, it would require sophisticated methods of natural language processing or artificial intelligence to even begin to directly employ a textual phrase such as, "find an image that shows trees swaying in the breeze" toward finding an image that depicts such a scene. Instead, prior art search engines have employed other approaches for image search, such as for example by comparing a textual search term to text in a document that is in close proximity to an image, and making the assumption that the image is likely to be related to the topic of the proximate text. This method works to some degree, but is imperfect and often fails.

Similar problems are being posed in other, newly emerging areas of internet search. One such area is commonly referred to as "local search". Local search is concerned with the problem of finding places, events, products, or services that are available within a specific geographic area. Local search differs from other search applications primarily in that the user is specifically concerned with local availability, implying that the desired search results should be limited to those that qualify in terms of the geographic location of the entities they describe. One reason why local availability may be important to the user is because the user may expect to visit the location at a later time in order to procure goods or services being sought. Prior art search engines typically fulfill this local qualification by various methods, such as by parsing search queries and database content for geographic clues such as street addresses or city names, and possibly additionally plotting search results on a geographically constrained map view.

However, the design of prior art search engines does not seem to recognize that a user's placement of importance on local qualification implicitly suggests that time of availability may be important as well. For example, if the target of interest is a local event, the prospect of the user actually attending the event suggests that his or her attendance must be timed to match the time of occurrence of the event. Events that occur at a time of day or on a date during which the user is not available or does not wish to attend may be of limited interest and should be eliminated from the results or given a lower relevance score. Similarly, if the topic of the search is a local retailer that offers a specific product or service to be acquired on a personal visit, then the days of the week and the times of day during which each candidate retailer is open for business becomes potentially important to scoring its relevance as a match. Retailers that are not scheduled to be open for business at a specific time or date the user may have in mind might be considered less relevant than those that will be open for business at that time.

Despite the potential importance of time availability to the user of a local search engine, prior art search engines do not support it effectively, and continue even in local search applications to provide only a primarily textual interface addressed toward primarily textually expressed search terms such as business name, business category, or names of specific products and services, and toward primarily textual expression of search results.

While it is straightforward to retrieve and express a list of businesses or events whose corresponding textual database entries match a textual search query, the issue of matching or expressing with respect to a criterion of time availability is not so straightforward. It is not immediately clear how to compose a search term in a textual interface in order to return only results that, for example, have availability on a Monday at 3:00 pm, especially if the search engine or the database it references do not employ suitable representations of time-related information. Similarly, scheduled events that occur on a one-time or repeating basis are not readily adaptable to time-related search in a prior art search engine.

Perhaps the most familiar sort of information relating to time availability in this context is the "hours of operation", or "business hours", of a retail or service business. A place of business that accepts walk-in business from the public typically keeps a regular schedule of time periods, usually expressed on a weekly basis upon which the schedule repeats, during which the business is open to customers, all other time periods being closed to customers or possibly open only by special appointment. The purpose for the business to schedule such hours, and by extension the ideal goal of a search engine in supporting information representative of such a schedule, is to provide potential customers, or users of said search engine, the ability to determine the availability of the products or services offered by the business at any random time that may be of interest to the user. The user therefore may have a strong interest in determining the scheduled availability of the business, and by extension its products and services, relative the time or time period in mind, with the least possible expenditure of cognitive effort.

In most consumer media, ranging from articles and advertisements, to typical web pages that describe a business, to signage posted on shopkeepers' front doors, business hours are most commonly encountered in the form of a textual or tabular representation that must be read and interpreted in order to draw conclusions about the availability of the business at a specific time. For example, such a description might read "9:00 am to 5:00 pm Monday thru Friday, 10:30 am to 3:00 pm on Saturday, 12:00 noon to 3:30 pm on Sunday". The cognitive task of bringing a specific time of interest into consideration, and processing it relative to such a schedule description, is a significant one. Furthermore, if the user wishes to "comparison shop" among multiple businesses, or has more than one potential time of interest in mind, it rapidly becomes a daunting task to determine the respective availability of each differently scheduled business at multiple alternative times of interest.

The user who is interested in time availability is therefore bound to be frustrated with prior art search engines whenever several aspects of time availability motivate his or her search. For example, there is often no way to limit a search to businesses that are open at a specific time of interest, or to products and services that by extension are available at a time of interest, or to events that occur at a specific time of interest. Also, it is difficult to gauge the relative degree of availability of businesses, their products and services, or events, at a specific time slot, or among a range or group of alternative time slots during an agreeable interval of time. Owing at least in part to the nonobvious nature that such a solution would possess, few if any prior art search engine interfaces accommodate the convenient or effective expression of time availability as a search query component, nor do they utilize information about time availability in identifying matching items, nor do they express relative time availability in the displayed list of results. The user experience with prevailing search engines is therefore not entirely satisfactory because the user cannot specify a time of interest as part of the search query, and is forced to manually inspect the provided list of search results to determine the time availability of each, if such information is even returned.

This discussion has made it clear that prior art search engine interfaces are not equipped to allow the user to work effectively with time-related attributes of sought items. In order to do so, such interfaces would need to provide a means to establish a time condition such that time-related information associated with database items may be evaluated relative the time condition, and depiction means by which search results may be communicated in a manner expressive of their time availability at the time or during the time period represented by the time condition, or at similar times.

BRIEF SUMMARY OF THE INVENTION

The invention is a search engine interface that provides a simple and convenient way to specify a time condition as a search query or as part of a search query, and that provides visual feedback to the user regarding the relative availability of database items at a range of specific times within a time period under consideration. The interface provides a new and unique way to provide for the interactive searching of a database that includes time availability information, in order to identify items that are available at a specific time and optionally that match one or more additional search term(s).

A preferred embodiment includes: one or more search term specification means by which a textual or other search term may be specified as part of a search query; a graphical representation means that (a) represents a time period within which one or more point(s) or period(s) of time are eligible to be specified as part of a search query, and (b) can represent the relative availability of items at specific times within the time period; and a search result display means that serves to identify items that are found to match the search query. The invention thereby provides an interface by which a user may conduct search queries with respect to a database, said database including time-related information that relates one or more states or properties of one or more database items to a representation of time. For example, said database items might describe a set of retail businesses, and said time-related information might describe the scheduled business hours of some or all of the businesses (that is, those time periods during which a given business is open to the public and outside of which the business is closed to the public). Or as another example, said database items might describe scheduled events that occur on a one-time or repeating basis, and said time-related information might describe the scheduled start times and end times of the events.

Advantages of the invention include providing a convenient way for the user of a search engine to specify a time condition applicable to a search, as well as to readily understand the relative time availability of returned matches with respect to this time condition as well as with respect to similar times. This makes it possible for the user to more easily and fully understand the time availability of products, services, events, and related topics, even in the context of a large and complex database of businesses, goods, services and events having widely differing time availability.

BRIEF DESCRIPTION OF THE SEVERAL VIEWS OF THE DRAWING

FIG. 1 depicts an example interface in which is provided a graphical element that is capable of expressing time availability.

FIG. 2 provides an example of how the business hours of a set of businesses might be converted to a visual expression that could be expressed by means of the graphical element of FIG. 1.

FIG. 3 depicts an example interface in which a graphical element expresses time availability of a set of businesses in addition to a textual list of businesses.

FIGS. 4 through 8 further depict the example interface as it might react to mouse interaction.

FIG. 9 depicts an alternate embodiment in which the graphical element possesses a variation on the areal features of the previous example.

FIG. 10 depicts yet another embodiment in which the graphical element has areal features similar to the general form of a pie chart.

FIG. 11 depicts how the invention might be combined with a geographic representation (map) of an area of interest.

DETAILED DESCRIPTION OF THE INVENTION

Figure 1:
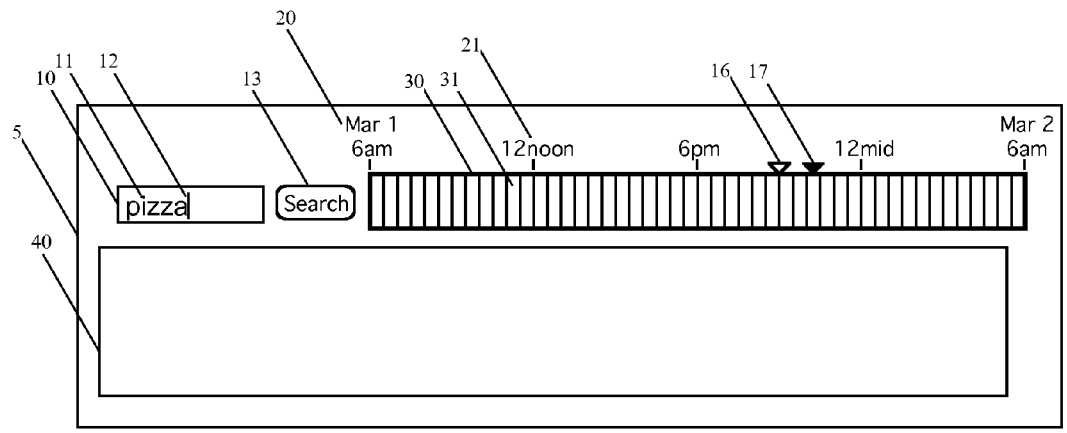
FIGS. 1-11 illustrate the main components of the invention and its preferred manner of operation, as it might appear when implemented as part of a world-wide-web page, viewed by means of an ordinary internet web browser. In addition to this example presented here for illustrative purposes, anyone skilled in the art after learning of this example may think of alternate implementations of the invention, such as in a client application that communicates with a local database rather than a remote web-based database.

FIG. 1 illustrates the main components of the invention as they would appear in the example embodiment. A representative portion 5 of a computer display screen (for example, a portion of an internet web page as viewed in a web browser) contains a search term specification control 10 (such as for example an edit field that accepts typed characters), a graphical element 30, optionally a display field 40 and optionally a button 13. In a manner to be detailed herein, by means of search term specification control 10 and graphical element 30, a search query may be composed that includes one or more search terms (by means of search term specification control 10) and a time condition (by means of graphical element 30). Optionally, the search query may consist of only a time condition, or only one or more search terms. When composed, the search query may be employed to identify one or more matching items, if any, represented in a database (not shown), said matching items then optionally being represented in display field 40 according to any applicable means common in the art, such as a list of the names of matching items, or a map showing the location of matching items. Preferably button 13 and/or any mouse click on graphical element 30 is used to direct the computer to perform a search query. Alternatively, the computer may be directed to perform the search whenever it detects that the content of search term specification control 10 has changed.

In search term specification control 10, the user may provide one or more search term(s) in order to specify that it form at least part of a search query (here, an edit field is employed, and it has accepted the user typing of textual search term 11 "pizza"; cursor 12 is shown merely to indicate that the user might continue typing additional letters or terms if desired). Search term specification control 10 need not be an edit field that accepts typing of a textual search term. Instead it could include one or more instance(s) of any control element that allows specification of any sort of information that can be employed as a search term for the purpose of searching a database; for example, it could be a popup menu that provides a menu of textual search terms or groups of such search terms to be selected among, or it could be a popup menu of symbols that represent specific textual search terms or groups of such search terms, or it could be a list or array of predetermined search terms or symbols that may be selected by clicking, or it could be a geographical representation such as an interactive depiction of a map that allows specification of a geographical location or area as a search term, or any other means of establishing one or more textual or non-textual search terms to be employed in a way similar to that of depicted textual string 11.

Graphical element 30 is an interactive representation of a time period. It may be seen that it possesses a geometric characteristic that is representative of a time period: preferably as in this example, graphical element 30 is a two dimensional shape, such as for example a rectangle, of which one geometric dimension is representative of a time period, and having an arbitrary extent in the other dimension; and comprising a plurality of visible or invisible discrete cells (each consisting of one or multiple pixels); each individual cell being taken to correspond to an individual time point or an individual constituent time interval within the time period. In this example, it may be seen by reference to graphical element 30 (its individual cells being optionally visibly outlined in FIG. 1), and by reference to optional labels such as 20, 21 that the period of time represented is a 24-hour period of time between a date March 1 at 6:00 am and a date March 2 at 6:00 am. In this example, this period of time is graphically divided into forty-eight constituent time periods of thirty minutes each, as indicated by the group of forty-eight inner cells of which cell 31 is representative.

In addition to acting as a visual representation of a time period, graphical element 30 also serves as a control by which a time or time period may be specified as part of a search query. For example, because each cell represents and therefore corresponds to a specific period of time, graphical element 30 provides the opportunity to interpret the act of a user clicking on (or hovering over, or dragging over) one cell or a group of cells as a request to include the corresponding time point(s) or time period(s) as part of a search query.

Optionally, it may be found beneficial to include a time indicator means, such as for example a small graphical arrow 16 pointing to a specific location on the graphical element 30, in order to convey to the user in a convenient manner the current time of day.

Optionally, it may be found beneficial to include a time condition indicator means, such as for example a small graphical arrow 17 pointing to a specific location on the graphical element 30, in order that the user may be aware of the currently active time condition, if any, that has been selected. (It should be noted that in FIG. 1, as will be seen, no time condition has been selected; therefore the location of arrow 17 is for illustrative purposes only).

Graphical element 30 is also capable of taking on a variable appearance in order to communicate to the user the potential availability of items (as this availability is represented in the database) during the period of time that graphical element 30 represents. To this end each individual cell (of which cell 31 is representative) is capable of taking on a coloration, shading, or other modification in its appearance, independently of the other cells. (In this discussion, a differential coloration is discussed for the purpose of example, but other obvious possibilities such as shading, animation, superimposition of one or more symbols, or any similar means of modification would apply as well).

More specifically, upon user specification of a search term such as search term 11, one or more cells of graphical element 30 may be individually colored or otherwise modified in a way derived from the number of database items that match said search term 11 and are available at the time or during the time period corresponding to the cell. For example, individual cell coloration might vary from a very light shade (or none)

representing no items available at the corresponding time, to a dark shade representing a maximum number of items available at the corresponding time. Thereby the cell(s) representing the time (or time period) at which (or during which) the greatest number of database items match the textual search term 11 would be colored the darkest.

Because this modification of appearance of graphical element 30 may be performed after specification of an initial search term 11 but before a time condition is specified via graphical element 30, it provides feedback that allows the user to make a more informed choice about the time condition to ultimately specify, if any, as part of the search query.

The basis for coloration or other modification of graphical element 30 is now described in detail. Suppose for example that the database is a database of local businesses, including information such as the names of restaurants, the names of items on their respective menus, and time-related information describing the business hours during which each restaurant is open for business and thereby its menu items are expected to be available to a customer. To make this example clear and simple, suppose that the database contains information about only three restaurants. In a real application, of course, the database would more typically include possibly thousands of items, including not only restaurants but many other types of businesses, their business hours, and the products and services offered by each.

Figure 2:
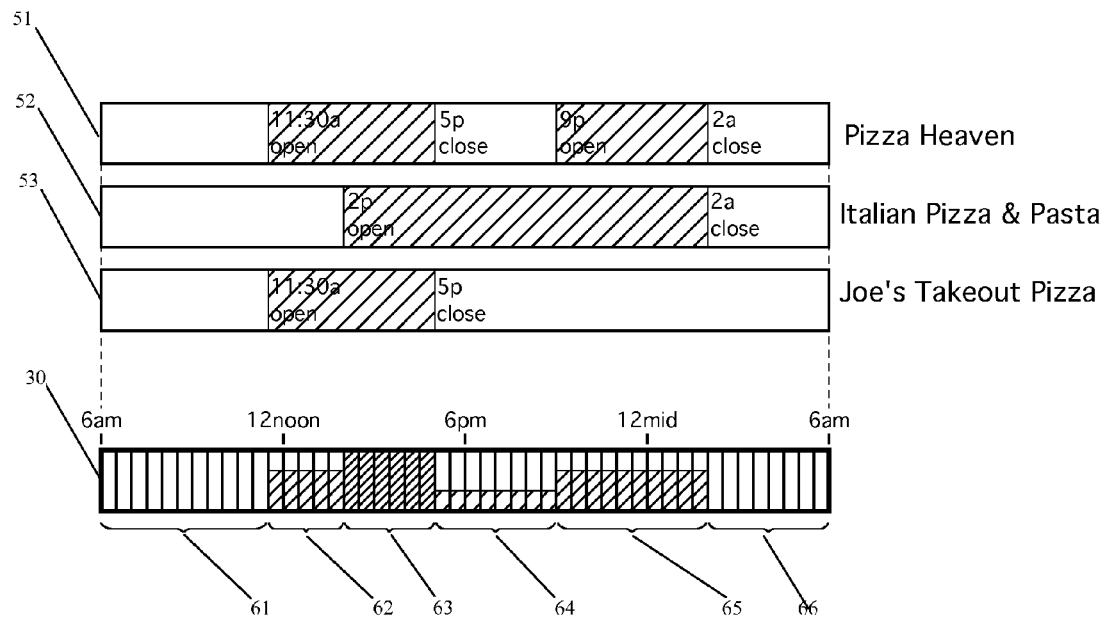

Referring now to FIG. 2, suppose that the database includes three restaurants, named "Pizza Heaven", "Italian Pizza & Pasta", and "Joe's Takeout Pizza". Suppose further that the database contains information that each restaurant has a single item on the menu, namely "pizza". Suppose further that the database also includes time-related information relating the scheduled open and closed status of each business to a representation of time, such as perhaps a repeating weekly schedule. For illustrative purposes, schedules 51, 52, and 53 are provided to the reader to represent the scheduled business hours of each restaurant during the time period represented by graphical element 30 of FIG. 1. During this period the restaurant called "Pizza Heaven" opens at 11:30 am, closes at 5:00 pm, reopens at 9:00 pm, and closes at 2:00 am. The restaurant "Italian Pizza & Pasta" opens at 2:00 pm and closes at 2:00 am. The restaurant "Joe's Takeout Pizza" opens at 11:30 am and closes at 5:00 pm.

A central basis of the invention stems from the realization that a plurality of time schedules such as the three schedules depicted in FIG. 2 may be aggregated into a single schedule, thereby expressing the relative degree of availability of members of the aggregated group during the course of the schedule time period. A graphical representation that is based upon an aggregated schedule provides a new and unique visual representation that helps a user to distinguish between different times or periods of time in terms of the relative degree of availability of member items at or during those times. This information may be helpful for planning purposes, for example, when conducting an internet search or other database search with the intention of finding items available at a specific time, or when trying to determine a time or time period when items of interest are most available. Therefore an aggregated schedule conveys a general sense of availability that could otherwise only be perceived by careful and laborious study of each individual schedule.

At the bottom of FIG. 2, it may be seen that an aggregated schedule (exemplified by graphical element 30 in the figure) has been produced from the three individual schedules 51-53. It may be seen that in each constituent cell of graphical element 30, a modification of appearance has been applied that is derived from the relative number of restaurants that are open at the time corresponding to the cell. The specific type of modification employed may be one of many conceivable visual modifications that can produce a visible variation in appearance. Suppose for this example that the modification in appearance consists of differential coloration of each cell to a color expressive of, and to a height that is proportional to, the percentage of businesses that are open for business at the time corresponding to the cell. By this example convention, the cells in region 61 have a very light color (or remain uncolored) because none of the restaurants are open for business during the time period they represent. The cells in region 62 are colored in a first color to a first height, representing the finding that two of the restaurants are open during this time period. The cells in region 63 are colored in a second color to a second height, representing the finding that three of the restaurants are open during this time period. The cells in region 64 are colored in a third color to a third height, representing the finding that only one of the restaurants is open during this time period. The cells in region 65 are colored to a color and height like those in region 62 because like region 62, during this period there are two restaurants open for business. Like in region 61, the cells in region 66 have a very light color (or remain uncolored) because, like in region 61, none of the restaurants are open for business during this time period. Therefore in this way, the modification of the appearance of graphical element 30 has resulted in a visual indication of the relative availability of the three businesses, and by extension the products and services they offer, at any time during the time period that the graphical element represents.

Figure 3:
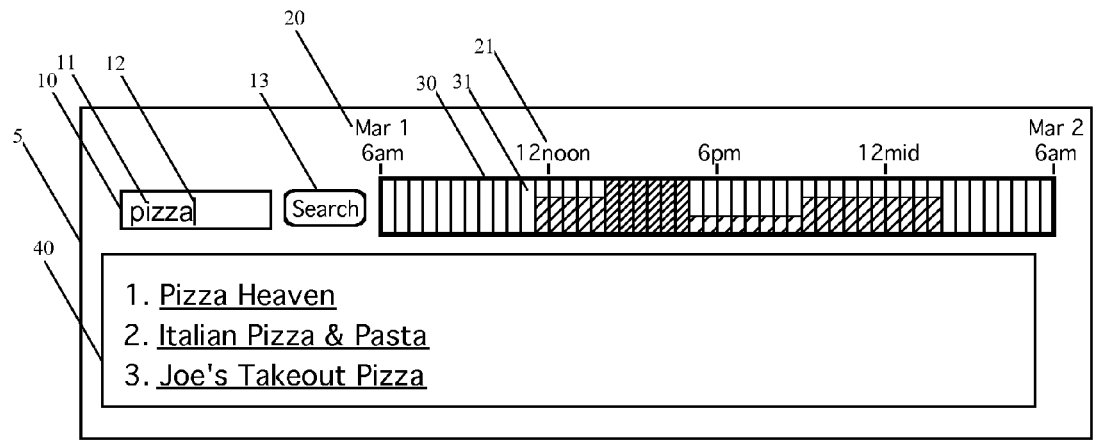

FIG. 3 illustrates the application of this schedule aggregation and appearance modification method in the context of the invention. Suppose that the textual search term 11 "pizza" has been specified via search term specification control 10. Furthermore, button 13 has optionally been clicked, signaling the computer to conduct a search of the database. Because only the textual search term 11 has been specified, and no time condition has been specified, the search query consists of the textual term "pizza", and therefore the computer searches for database items that match this term. Because the database indicates that all three restaurants in the database have pizza as a menu item (or optionally, only because or additionally because they all have "pizza" in their name), all three restaurants are found to match this term. As a result, graphical element 30 has received a modified appearance according to the process described above. Additionally, display field 40 optionally displays a list of the three restaurants found in the database that match the textual search term 11 (their names, for example, optionally being hyperlinked to other pages or views by which the user can learn more information about each). The information presented in display field 40 may include any information useful in helping the user understand the identity and/or other characteristics of matching items. Instead of or in addition to a list of names, it could include a set of individual availability schedules corresponding to each matching item, like the schedules 51-53 depicted in FIG. 2. Similarly, it could include a geographic view such as a map that indicates at least the geographic location of matching items.

Up to this point, the user has not yet provided any time condition as part of the search query, and has merely been provided with a list of all businesses represented in the database that are known to serve pizza. However, according to one aspect of the invention the user has also been provided with the resultant modification of graphical element 30, indicating the relative availability of pizza from these businesses during the course of the day, that is, during the time period represented by graphical element 30. Should the user have a specific desire to find pizza at a specific time of day, graphic element 30 provides feedback helpful in determining the relative degree of success to be expected in finding a suitable vendor at various times during the day, before conducting any additional time-conditioned searches. For example, if the user is searching for a vendor that serves pizza at 5:00 am, graphic element 30 has indicated that no vendors serve pizza at 5:00 am, precluding the need to conduct an additional time conditioned search. Similarly, if the user wishes to determine what time of day would be a good time to go out for pizza, graphic element 30 has indicated that the time period between 2:00 pm and 5:00 pm offers the greatest number of vendors to choose from. This feedback might encourage the user to plan on going out during that time period rather than another, and to identify specific vendors by conducting a time-conditioned search that specifies one or more times in that time period, rather than a time period when less choice may be expected.

Furthermore, if the user does decide to conduct a time-conditioned search, graphic element 30 also provides a convenient and intuitive means to specify the time condition and to signal the computer to conduct a search with respect to that time condition (that is, for example, by clicking directly on the cell representing the time or time period of interest).

In the following set of examples, FIGS. 4-8 illustrate how a user might select various time conditions with a pointing device or "mouse" while using the invention, and to illustrate how the invention reacts as different time conditions are specified. In these examples, a convention has been chosen in which the horizontal pixel position of the mouse pointer within graphical element 30 is converted to a time point by interpolation within the time period represented by graphical element 30, so that a single time point is employed as the time condition in each instance.

Figure 4:
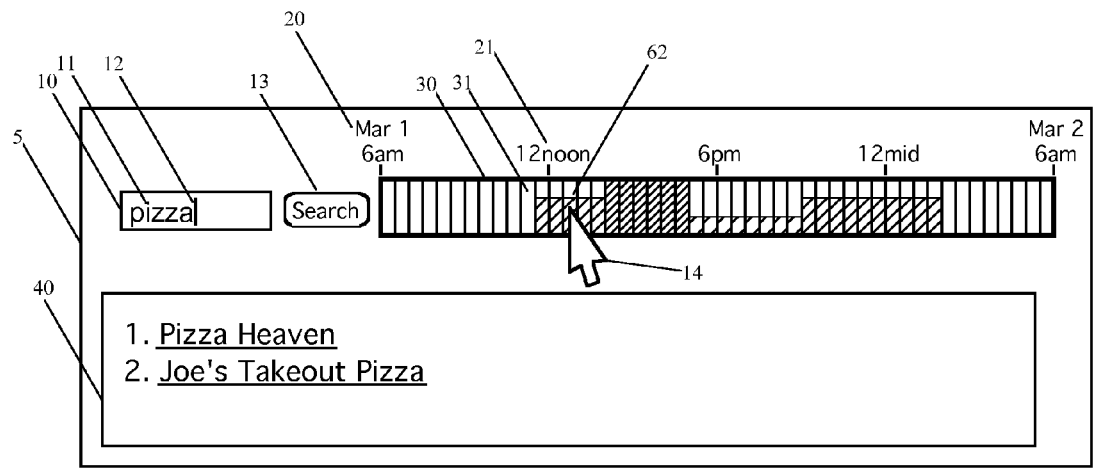

Referring now to FIG. 4, mouse pointer 14 has been moved into a position over cell group 62 (or, alternatively, clicked on that position), thereby designating a specific time (approximately 12:45 pm) as a time condition for the search query. The search query is now composed of the search term 11 "pizza" and a time condition representing 12:45 pm on March 1. According to the time-related information represented in the database for each restaurant (also depicted in FIG. 2), only two restaurants that match "pizza" are open for business at this time, namely "Pizza Heaven" and "Joe's Takeout Pizza". Accordingly, only those two restaurants are listed in display field 40.

Figure 5:
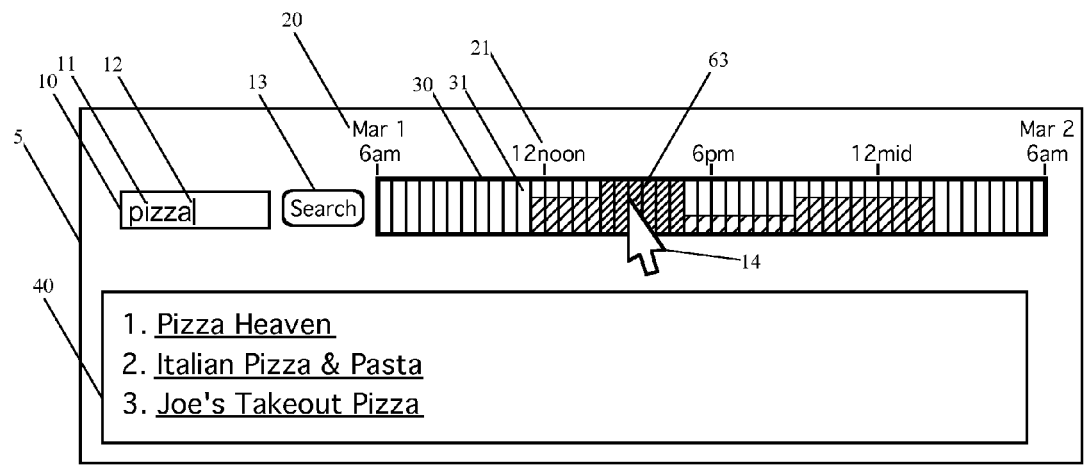

Referring now to FIG. 5, mouse pointer 14 has been moved into a position over cell group 63 (or, optionally, clicked on that position), thereby designating a specific time (approximately 3:00 pm) as a time condition for the search query. The search query is now composed of the search term 11 "pizza" and a time condition representing 3:00 pm on March 1. At this time, three restaurants that match "pizza" are open for business, namely "Pizza Heaven", "Italian Pizza & Pasta", and "Joe's Takeout Pizza". Accordingly, those three restaurants are listed in display field 40.

Figure 6:
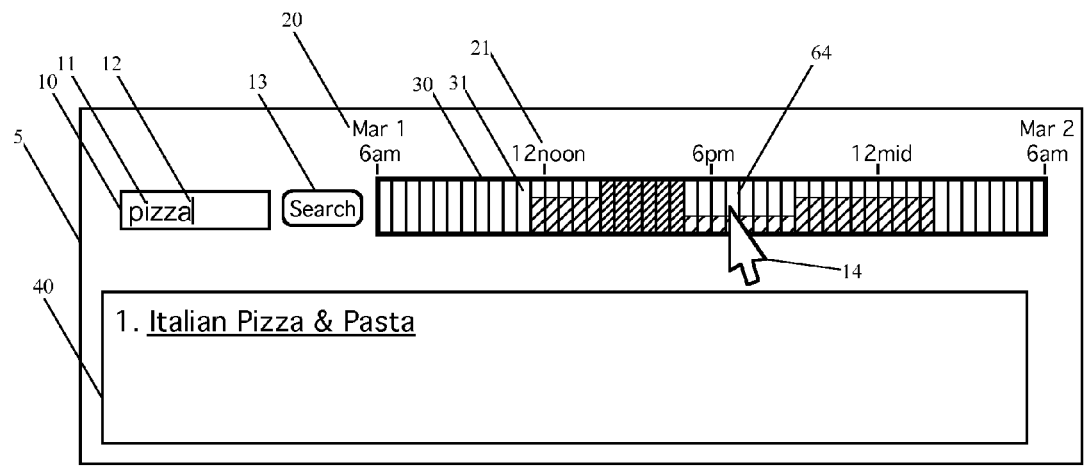

Referring now to FIG. 6, mouse pointer 14 has been moved into a position over cell group 64 (or, optionally, clicked on that position), thereby designating a specific time (approximately 6:40 pm) as a time condition for the search query. The search query is now composed of the search term 11 "pizza" and a time condition representing 6:40 pm on March 1. At this time, only one restaurant that matches "pizza" is open for business, namely "Italian Pizza & Pasta". Accordingly, only that restaurant is listed in display field 40.

Figure 7:
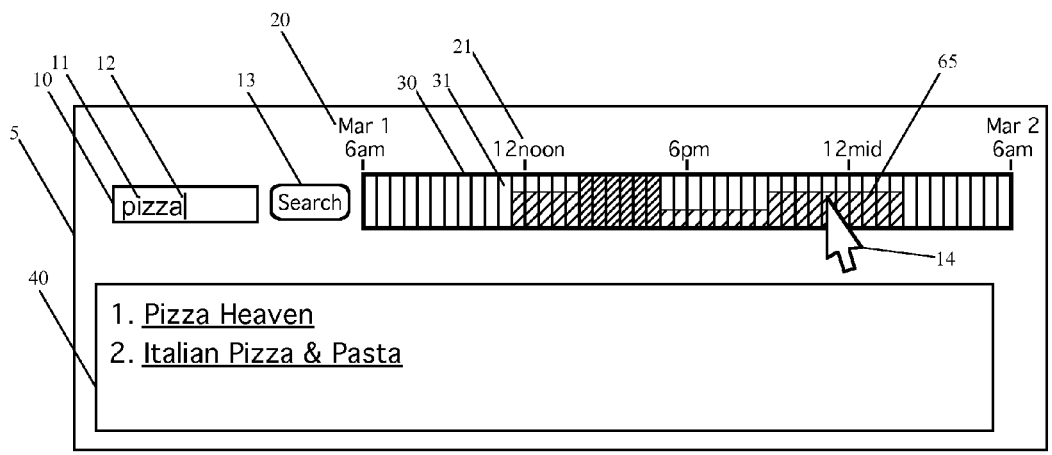

Referring now to FIG. 7, mouse pointer 14 has been moved into a position over cell group 65 (or, optionally, clicked on that position), thereby designating a specific time (approximately 11:10 pm) as a time condition for the search query. The search query is now composed of the search term 11 "pizza" and a time condition representing 11:10 pm on March 1. At this time, only two restaurants that match "pizza" are open for business, namely "Pizza Heaven" and "Italian Pizza & Pasta". Accordingly, only those two restaurants are listed in display field 40.

Figure 8:
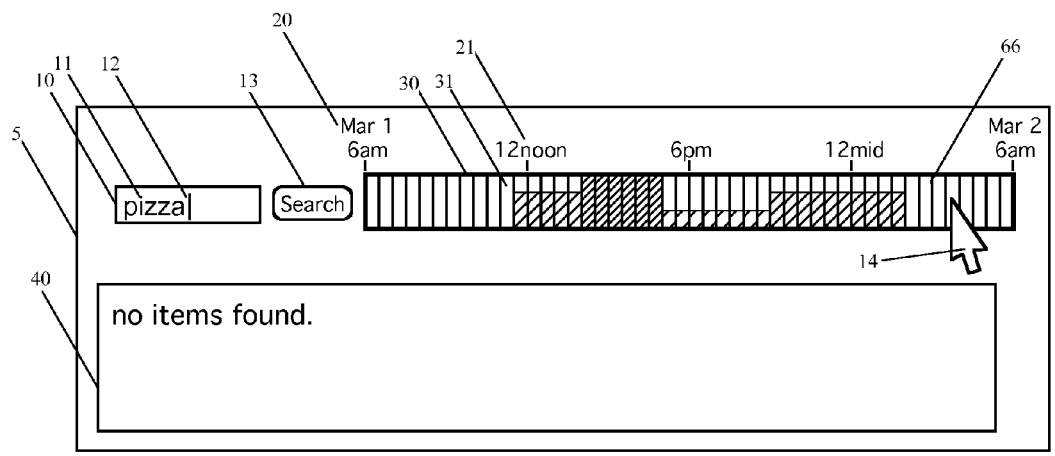

Referring now to FIG. 8, mouse pointer 14 has been moved into a position over cell group 66 (or, optionally, clicked on that position), thereby designating a specific time (approximately 3:40 am) as a time condition for the search query. The search query is now composed of the search term 11 "pizza" and a time condition representing 3:40 am on March 2. At this time, no restaurants that match "pizza" are open for business. Accordingly, no restaurants are listed in display field 40.

The foregoing examples have employed (in graphical element 30) the use of a differential coloration or shading of rectangular cells as a means of communicating the availability of database items at specific times during the time period, and has employed the rectangular areal region of each rectangular cell as a basis upon which to convert a mouse position to a time condition. It is anticipated that many other formats may be employed to perform these functions, including any format that includes an areal region means representative of a time period and supports variable depiction of said areal region means such that availability of matching items at specific time intervals may be communicated.

Figure 9:
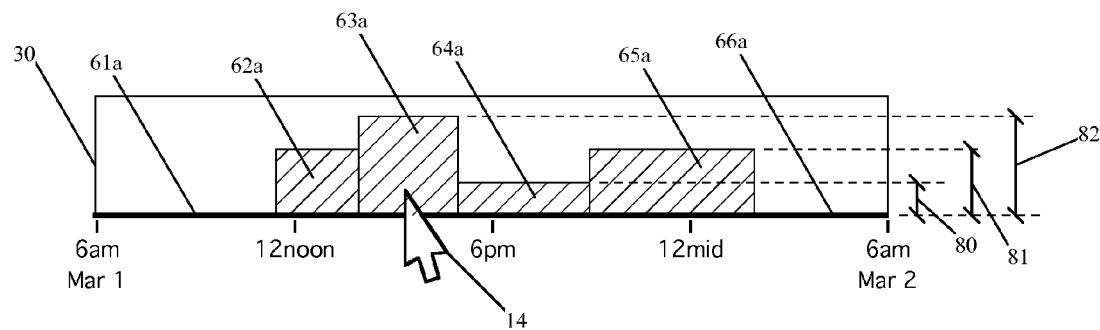

For example, referring to FIG. 9, in an alternate embodiment graphical element 30 might more directly take the form of a histogram, including one or more vertical bars whose respective heights are representative of the relative availability of items at corresponding times, and whose areal regions provide a basis by which to convert mouse position to a time condition. For example, it may be seen that the heights 80, 81, and 82 of histogram bars 62a-65a are derived from the relative number of items that are available within each corresponding time period. Specifically, if bar 63a is taken to be one unit high, then bar 62a is ⅔ of a unit high, bar 64a is ⅓ of a unit high, and bar 65a is ⅔ of a unit high; these heights being seen to correspond to the ratio of the number of items matching the search term 11 within the corresponding time period of the bar (i.e. [from left] two, three, one, and two), to the total number of items matching the search term at any time period (three). Alternatively, the height of each bar could be derived from the absolute number of items corresponding to each bar, rather than a ratio. For greater visual impact, it is anticipated that the bars could receive a differential coloration in addition to a variation in height. Obviously, the histogram of FIG. 9 may be oriented vertically rather than horizontally, or in any orientation, or include a distinct bar for each constituent time cell rather than a single bar for each group of cells having the same height, without departing from the spirit and scope of the invention. Optionally, rather than drawing no bars in areas where the height of the bars would be zero (such as at 61a and 66a), the base of the histogram could be thickened to provide a more definite area on which the user may click the mouse to specify the corresponding time conditions.

Figure 10:
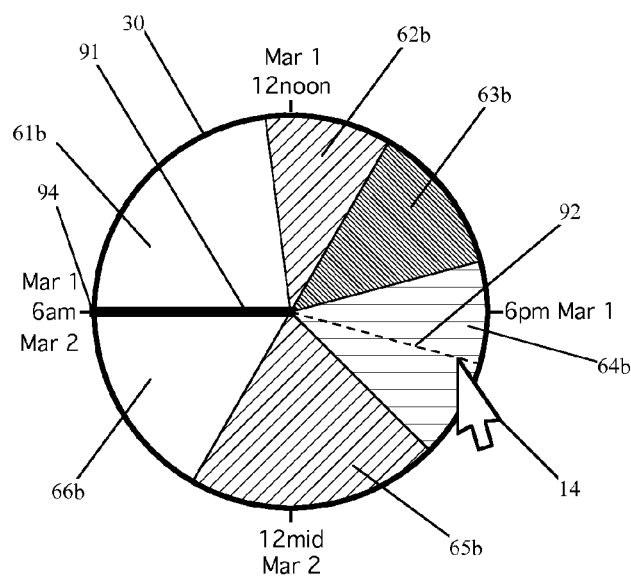

As another example alternate embodiment, consider FIG. 10 in which graphical element 30 takes the form of a circular shape. Here, the geometric characteristic representative of a period of time is the circular sweep of the arc, rather than the horizontal geometric dimension of the previous example. Here the circular shape is suggestive of a 24-hour clock. The time period is represented by the clockwise arc of the circle, beginning and ending at an origin point 94 where it intersects optional day delineator 91. The position of origin point 94 is arbitrary but preferably follows the convention of placing 12:00 noon at the top of the circle. Here, a time period is represented by a wedge of the circle rather than a rectangular cell or a histogram bar. Specifically, regions 61b-66b represent the time periods depicted in the previous figures, and take on differential coloration according to the same process depicted in those previous figures. These regions also act as the areal region basis by which to convert mouse position to a time condition. For example, the position of mouse pointer 14 could be interpreted to specify that the time condition consist of any of: the start time of region 64b (5:00 pm), or the end time of region 64b (9:00 pm), or the time period between 5:00 pm and 9:00 pm, or the specific time point represented by the radius 92 that intersects the mouse pointer 14 (approximately 7:00 pm).

Figure 11:
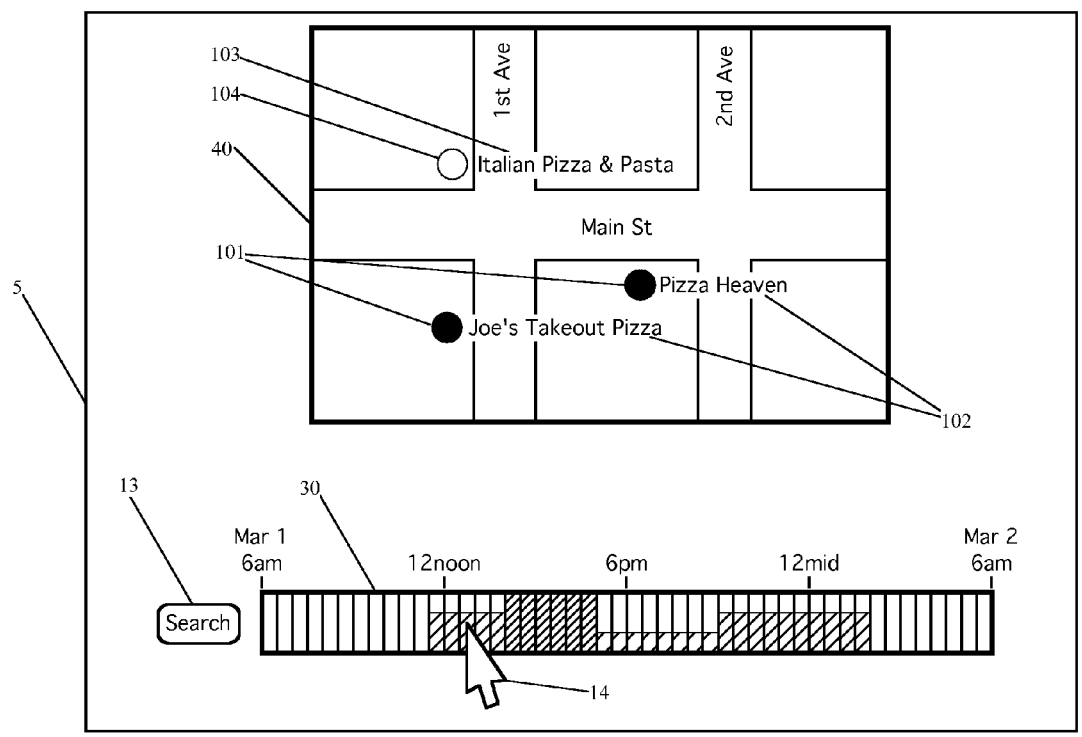

In yet another embodiment, consider FIG. 11 in which display field 40 takes the form of an interactive digital map. Here, display field 40 performs the function of providing and/or allowing specification of a search term, in the form of information representing the geographic region currently displayed by the map; and also performs the function of displaying found items. Here the search query consists of information representing the geographic region indicated by display field 40, and a time condition indicated by the position of mouse pointer 14 over graphical element 30. Two restaurants, namely "Pizza Heaven" and "Joe's Takeout Pizza", match this search query and are highlighted (by means of, for example, black dots 101) and also, for example, labeled by labels 102. Because "Italian Pizza & Pasta" does not match the time condition but does reside in the area of the map view, it is not highlighted, although optionally it is shown in its location on the map. The interactive digital map in display field 40 is assumed to be accompanied by any sort of map view control as is common in the digital mapping art, by which the user may change the map view (perhaps by panning or zooming) and thereby change the geographic search term that the map view establishes. Optionally, of course, this embodiment could additionally include other means of supplying additional search terms, such as perhaps any of the previously mentioned forms of search term specification control 10 (depicted in FIG. 1 and other figures).

In addition to the specific example embodiments described above, anyone skilled in the art may now see that the invention may take on many variations without departing from the spirit and scope of the invention. Some of these variations are discussed below for the purpose of illustration, without intent to limit the scope of the invention.

It is anticipated that mouse or keyboard events, such as the position of mouse pointer 14, may be translated into a specification of a time condition in any number of ways that are now quite apparent. For example, it may be initiated by reference to a change in the position of the mouse pointer as it hovers over a specific cell, or the event of a mouse click on a specific cell, or the event of a double mouse click on a specific cell. Furthermore, the time condition may be derived from the mouse position in any number of ways, such as a time point corresponding to the position of the individual pixel that the mouse pointer is over (as in the preceding examples); or a time period corresponding to the time period represented by the cell the mouse pointer is over; or a time point corresponding to the beginning, or the end, of the time period represented by the cell; or the cell group time period represented by the group of contiguous and similarly modified cells the mouse pointer is over; or a time point representing the beginning, or end, of said cell group time period. Still further, the interface may provide for the user to select a group of time cells in commonly known ways such as by dragging a marquee with the mouse or by shift-clicking a plurality of individual cells with the mouse and keyboard shift key. And still further, keyboard arrow keys could be used additionally or exclusively as a means to specify a time condition. For example, in a manner commonly known in the computer interface art, the pointing device may be dispensed with and instead the Tab key could be used to direct focus to various components of the computer display, and when the graphical element 30 thereby receives focus, the keyboard arrow keys may become functional in selecting one or more time cells as the time condition (perhaps advancing and decrementing the time condition by use of the right and left arrow keys). These variations represent commonly encountered design choices familiar to any experienced designer or programmer of an implementation of the invention. Alternatively, the variations could be left to the user to choose among by means of user options or preference settings.

It is important to note that, in conducting an initial search, optionally the user might choose to forgo the step of pressing button 13 (which would have caused the appearance of graphical element 30 to be modified as described above), and instead click directly on graphic element 30 in order to immediately specify a time condition and signal the computer to immediately conduct a (therefore time conditioned) search. This case differs little from the previous case, except that the initial set of matching items returned to the user would be time conditioned, that is, would match both the search term and the time condition. Graphical element 30 would still take on a resultant modification of appearance indicative of the availability of matching items found to be available at this and other times, and therefore would still be useful in informing the choice of a time condition to specify in one or more subsequent searches.

It is likewise important to note that button 13 is an optional element of the invention. As previously suggested, if button 13 were not provided, the computer may be directed to perform the search whenever it detects that the content of search term specification control 10 has changed, or whenever graphical element 30 is clicked (or even whenever the mouse is hovered over it). That is, given a sufficiently responsive implementation, such as in a client application on a desktop computer rather than in a web page hosted on a server computer and interacted with across the internet, the search action may be fully automatic and immediately responsive to any detected changes in the composition of the search query. For example, every letter typed in search term specification control 10 (as an edit field) might cause a search to be conducted with respect to the current (possibly incomplete) contents of the control. This method (sometimes referred to in the art as "live search") is increasingly common in the art and is applicable to the search interface of the invention.

If a time period instead of a time point is to be employed as the time condition, the possibility arises that for one or more individual schedules of availability of one or more database items, the time period may fall partly within and partly outside of a scheduled interval of availability. To account for these situations, a convention may be adopted governing whether to consider the item as fulfilling the time condition or not. For example, the decision could be made to reject any intervals that do not overlap fully with the time period, or to allocate membership of partially overlapping items in the aggregated schedule in a proportional manner. Other options will be apparent to those skilled in statistics and related arts.

Furthermore, if a time condition has been specified at one point, optionally it may be "inherited" by subsequent searches and thereby participate in them, until it is changed or cleared, rather than require that a time condition be explicitly specified prior to each time conditioned search event. To this end as is known in the art the inheritance might be implemented by the use of a browser "cookie", and an option or preference setting may be provided to the user to enable or disable such behavior. Additionally or alternatively a control such as a button or other means or protocol may be provided by which the user may at any time clear a previously established time condition so that no time condition is present in the search query.

Several ways of interacting with the invention are explicitly anticipated. In a first way (as previously described), the user first specifies a search term via search term specification control 10, then clicks button 13 to return a set of non-time conditioned matching items and cause the appearance of graphical element 30 to become modified, then optionally inspects graphical element 30 in order to consider and/or specify a time condition to be included in a subsequent search query. In a second way, the user first specifies a search term as in the first way, then specifies a time condition by clicking on (or otherwise interacting with) graphical element 30, causing a time conditioned set of matching items to be returned and also causing the appearance of graphical element 30 to be modified. In a third way, the user begins to type or continues typing a textual search term, causing a search to be immediately conducted on a partially typed or completely typed search term, and graphical element 30 accordingly modified. In a fourth way, the user does not provide any search term via search term specification control 10 but instead begins by clicking (or otherwise interacting with) graphic element 30 in order to specify a time condition and initiate a time conditioned search absent any other search term (thus returning the set of all items having availability at the corresponding time). Many similar ways of interacting with the invention may be imagined given the set of primary elements present in the invention and given familiarity with typical patterns of use of a typical user interface on a web page or client application that acts as an interface to a searchable database.

Instead of determining the time condition by means of a mouse click or mouse hover over the graphical element 30, it is anticipated that the time condition may alternatively be specified by means of an auxiliary control united with or placed in position near graphical element 30. For example, anyone skilled in the art having learned the advantages of providing an areal or linear representation of time for the purposes disclosed herein might conceive of several approaches commonly employed in the art for user selection of a location along an axis, such as for example a so-called "slider" control by which the user may use the mouse to move a "thumb" element along a linear axis and thereby specify a position that could be converted to a time condition. Similarly, the "thumb" of a scroll bar, or any similar common user interface device, might be employed for this purpose. Clearly any such auxiliary means of specifying a time condition relative a representation of time, when used for the purposes of the invention, is not a unique invention and would fall within the scope of the invention being claimed herein.

Optional display field 40 of the preceding figures does not need to be fixed or permanent on the computer screen, but could instead be implemented as a popup display element that only appears when the user signals it to appear. For example, when the mouse is brought into position over a given cell of graphical element 30 that corresponds to a time of interest to the user, the display field 40 could appear in a popup element or window (in the style of what is commonly known as a "tooltip" window) and be populated with items that match said time of interest and any other active search term(s); when the mouse leaves the cell to enter another cell, the popup window could be repopulated with the corresponding set of matching items corresponding to the time of the new cell; and after the mouse leaves the graphical element 30 entirely, the popup could disappear.

In the examples shown in FIGS. 2-8, the graphical element 30 was divided into forty-eight cells. Alternatively it could be divided into any number of cells rather than forty-eight, either a greater number or a smaller number of cells. The fineness of resolution of the cell structure is limited only by the pixel resolution of the computer screen, the minimum cell being one pixel. Rather than a fixed number of cells, the number and/or size of cells could vary depending on any number of conditions experienced during runtime, such as for example the number of matching items returned by a given search event, or the degree of variation in the number of items returned corresponding to each cell.

While the preceding example figures each included two labels indicating calendar dates (March 1 and March 2 specifically), labels such as these, and in some cases any representation of a calendar date in the invention, are optional. For example, if the database represents business hours of businesses and these business hours are taken to repeat on a repeating weekly schedule indefinitely, then it is not necessary for the invention to employ knowledge or specification of any specific calendar date in order to determine the availability of a business at a given time, but only a day of the week. Therefore in this case, instead of calendar dates, the optional calendar date labels and any representation of calendar date internally to the invention might just as easily have been in the form of specified days of the week, such as "Tuesday" and "Wednesday".

Although the database described in these examples was a database of businesses, their menu items, and their business hours, the invention is not restricted to this subject matter. The invention is equally applicable to any subject matter that can be described as having variable availability as a function of time. For example, instead of businesses and their business hours, the invention could by the same general methods allow searching of a database of one-time or repeating events.

In fact, properties or states other than availability may also be searched and displayed by means of the interface described herein. For example, one could apply the invention to a database that describes the expected height of the ocean tide in various locations as a function of time. In this case, the search term 11 might be used to match a city or port name, and the modification of graphical element 30 could serve to communicate relative height of tide at various times of day at locations matching the search term. The user would then be able to use the feedback provided via the graphical element in order to further specify a time condition, in order to find local locations at which the tide is unusually low, or unusually high, or normal, at a specific time.

As disclosed in the preceding discussion, the search query used for searching of the database according to the invention may include one or more search term(s) and a time condition, or one or more search term(s) alone, or a time condition alone. Said search term(s) may be of any nature without departing from the scope and spirit of the invention. For example, although the examples described employed a textual search term provided by means of user typing in an interactive edit field, any other varieties of search term(s) may be used instead or additionally in the invention. As one example of many such possibilities, information representative of a geographic location or geographic area could easily be employed instead of, or in addition to, the search term depicted in the examples. The inclusion of such additional or alternative forms of search term in the service of the operation of the invention would not constitute a new invention separate from that claimed herein.

The foregoing embodiments and examples are provided as illustrative examples of specific embodiments that fall within the spirit and scope of the invention, for the purpose of providing an understanding of the invention. They are not to be taken to fully delineate all potential implementations that would fall within the scope of the invention. Anyone skilled in the art, upon learning of and understanding the specific examples described herein, may conceive other minor variations that would nevertheless fall within the spirit and scope of the invention claimed herein.

The invention claimed is:

1. An apparatus for providing a user interface for searching a computer database, said database containing information describing represented entities, said information including time-related information that relates one or more states or properties of said entities to one or more measures of time, comprising:
   a computer, referencing a region of display having at least two geometric dimensions;
   a time axis, definable in rectangular or polar coordinates with respect to said region of display, wherein geometric distance along said time axis is representative of the progression of time;
   a first geometric region, defined relative said region of display;
   said first geometric region establishing a first time axis dimension, as the component of the geometric extent of the first geometric region in the direction of said time axis;
   a graphical element, defining a second geometric region;
   said second geometric region establishing a second time axis dimension, as the component of the geometric extent of the second geometric region in the direction of said time axis;
   said first time axis dimension being representative of a first interval of time;
   said second time axis dimension being representative of a second interval of time no larger than the first interval of time;
   wherein the ratio between the respective durations of said second and first intervals of time is substantially similar to the ratio between the respective dimensions of said second and first time axis dimensions;
   wherein the start time of the second interval of time relative the start time of the first interval of time is substantially proportional to the geometric position, along the time axis, of the second geometric region relative the first geometric region;
   wherein the computer is programmed to perform a matching operation wherein the database is referenced to determine the quantity of database items that match a specific state or property for an included point or interval of time within said second interval of time;
   wherein the computer is programmed to derive a metric based at least in part on said quantity;
   wherein the computer is programmed to assign a visual appearance for said graphical element, said visual appearance being derived at least in part from said metric; and
   wherein the computer is programmed to cause said graphical element to be displayed on a display screen according to said visual appearance.

2. The apparatus of claim 1 additionally comprising:
   a search term specification means by which one or more textual or other search terms may be specified;
   the computer being programmed to additionally consider matching of said search terms in said matching operation.

3. The apparatus of claim 2 wherein:
   said search term specification means includes any of, or any combination of: a user-editable text field; a menu containing one or more selectable text items; a menu containing one or more selectable symbols each corresponding to one or more textual search terms; or a digital map view establishing a geographic search term.

4. The apparatus of claim 1 wherein:
   said visual appearance is characterized by any of or any combination of: area, color, shape, size, texture, or animated behavior of said graphical element.

5. The apparatus of claim 1 wherein:
   said first geometric region and said graphical element are more or less rectangular in shape;
   said graphical element is one of a plurality of graphical elements, represented visibly or invisibly, and each corresponding to a respective interval of time within said first interval of time such that said plurality of graphical elements together constitute all or a portion of said first interval of time.

6. The apparatus of claim 1 additionally comprising:
   the computer having a pointing device capable of establishing a screen position on the display screen in response to user input;
   the computer being programmed to establish a time condition by converting said screen position to a time position with respect to the time axis, and converting said time position to a time point or time period proportionally corresponding to its position relative said first time axis dimension;
   the computer being programmed to cause said time condition to be employed as said included point of time.

7. The apparatus of claim 6 additionally comprising:
   a screen display field by which a measure of said quantity is communicated to the user.

8. The apparatus of claim 1 wherein:
   said first geometric region is more or less circular or elliptical in shape;
   said time axis is an angular dimension, extending in a rotational direction about a point contained within said first geometric region;
   said graphical element is a sector of said first geometric region bounded by a finite segment of said time axis.

9. The apparatus of claim 1 wherein:
   said specific state or property is, for said entities that are a business, the state of being open for business, and for said entities that are an event, the state of the event being in progress.

10. A method for providing a user interface for searching a computer database, said database containing information describing represented entities, said information including time-related information that relates one or more states or properties of said entities to one or more measures of time, said method comprising:
   establishing a time axis, defined in rectangular or polar coordinates with respect to a region of display of a computer display screen, wherein geometric distance along said time axis is representative of the progression of time;
   establishing a first geometric region, defined relative said region of display;
   establishing a first time axis dimension, as the component of the geometric extent of the first geometric region in the direction of said time axis;

establishing a first interval of time, wherein said first interval of time has a duration corresponding to the extent of the first time axis dimension relative the time axis;

establishing a graphical element, thereby defining a second geometric region;

establishing a second time axis dimension, as the component of the geometric extent of the second geometric region in the direction of said time axis;

establishing a second interval of time, wherein the ratio between the respective durations of the second and first intervals of time is substantially similar to the ratio between the respective dimensions of the second and first time axis dimensions, and wherein the start time of the second interval of time relative the start time of the first interval of time is substantially proportional to the geometric position along the time axis of the second geometric region relative the first geometric region, and wherein the second interval of time is no larger than the first interval of time;

performing a matching operation wherein the database is referenced to determine the quantity of database items that match a specific state or property for an included point or interval of time within said second interval of time;

deriving a metric based at least in part on said quantity;

assigning a visual appearance for said graphical element, said visual appearance being derived at least in part from said metric; and causing said graphical element to be displayed on the display screen according to said visual appearance.

11. The method of claim 10, additionally comprising:

identification of one or more textual or other search terms; application of said search terms to said matching operation.

12. The method of claim 11 wherein:

said search terms are specified by a user by means including any of, or any combination of: a user-editable text field; a menu containing one or more selectable text items; a menu containing one or more selectable symbols each corresponding to one or more textual search terms; or a digital map view establishing a geographic search term.

13. The method of claim 10, wherein:

said visual appearance is characterized by any of or any combination of: area, color, shape, size, texture, or animated behavior of said graphical element.

14. The method of claim 10 wherein:

said graphical element is more or less rectangular in shape; and said graphical element is one of a plurality of graphical elements, represented visibly or invisibly, and each corresponding to a respective interval of time within said first interval of time such that said plurality of graphical elements together constitute all or a portion of said first interval of time.

15. The method of claim 10, additionally comprising:

determining a screen position on the display screen as indicated by a pointing device;

establishing a time condition, by converting said screen position to a time position with respect to the time axis, and converting said time position to a time point or time period proportionally corresponding to its position relative said first interval of time.

16. The method of claim 15 additionally comprising:

displaying a screen display field by which a measure of said quantity is communicated to the user.

17. The method of claim 10 wherein:

said time axis is an angular dimension, extending in a rotational direction about a point on the display screen; and said graphical element is a sector originating at said point and bounded by a finite portion of said time axis.

18. The method of claim 10 wherein:

said specific state or property is, for said entities that are a business, the state of being open for business, and for said entities that are an event, the state of the event being in progress.

* * * * *